United States Patent [19]
Lasiter

[11] 4,046,018
[45] Sept. 6, 1977

[54] WHEEL BALANCING APPARATUS

[76] Inventor: Glennis W. Lasiter, Kershaw Trailer Court, Colona, Ill. 61241

[21] Appl. No.: 720,177

[22] Filed: Sept. 9, 1976

[51] Int. Cl.² .................................. G01M 1/12
[52] U.S. Cl. .................................. 73/482
[58] Field of Search .................. 73/482–487

[56] References Cited

U.S. PATENT DOCUMENTS

| 915,718 | 3/1909 | Bassett | 73/483 |
|---|---|---|---|
| 923,401 | 6/1909 | Bassett | 73/482 |
| 923,402 | 6/1909 | Bassett | 73/482 |
| 1,774,718 | 9/1930 | McCabe | 73/482 |
| 2,136,633 | 11/1938 | Morse | 73/482 |
| 2,265,897 | 12/1941 | Ghetto | 73/483 |
| 2,816,446 | 12/1957 | Palmer | 73/483 |
| 3,921,462 | 11/1975 | Hamer | 73/482 |

FOREIGN PATENT DOCUMENTS

| 177,509 | 1922 | United Kingdom | 73/482 |

*Primary Examiner*—Herbert Goldstein
*Attorney, Agent, or Firm*—Henderson, Strom & Sturm

[57] ABSTRACT

A stand assembly having an upright standard and a support plate affixed to the upper end of the upright standard. A pair of balancing posts are affixed to the support plate, each balancing post being disposed adjacent one end of the support plate. A wheel support includes formed in the underside thereof a pair of depressions, the balancing posts fitting within the depressions when the wheel support is mounted upon the stand assembly. A sensitivity adjustment is attached to the wheel support and depends therefrom. The sensitivity adjustment indicates the degree of tilt of the wheel support when a wheel is mounted thereon, and has a movable weight member which is operated to adapt for wheels of different sizes and ground or floor surfaces of different degrees of smoothness.

5 Claims, 8 Drawing Figures

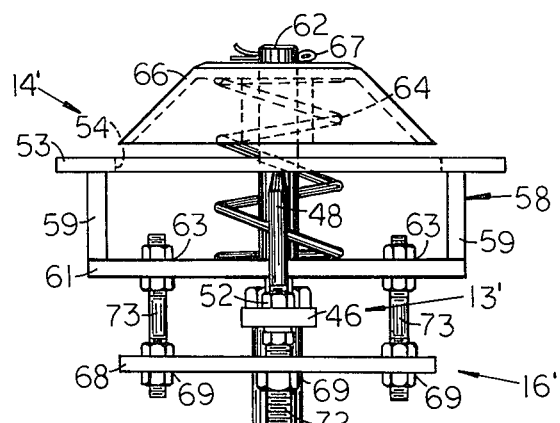
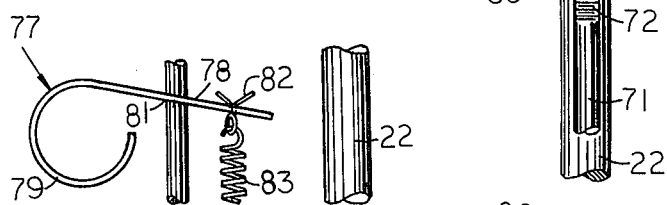
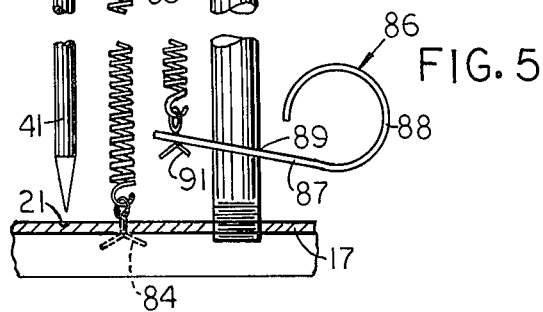
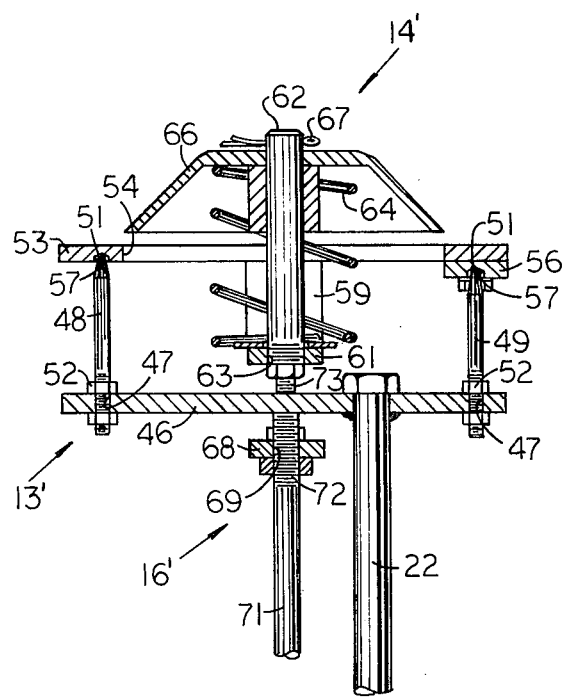
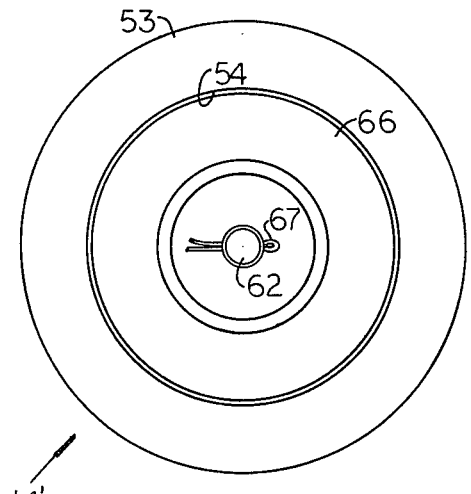

WHEEL BALANCING APPARATUS

BACKGROUND OF THE INVENTION

The wheel balancing apparatus of this invention relates generally to balancing devices. More specifically the wheel balancing apparatus relates to static balancing devices for balancing vehicle wheels.

While spin-balancing devices are available, these devices, which spin the wheel rapidly about its axle and employ stroboscopic or other apparatus to detect wobbles indicative of wheel unbalance, are rather complex and much too expensive for a private individual or a typical small garage or service station to acquire and use easily. Static balancing devices are available which are much less expensive. These devices generally employ a central spindle upon which the wheel is mounted. The spindle is pivotally mounted at a central point such that the spindle and wheel mounted thereon may tilt together in any direction about the central point. A bubble-type level is mounted on the spindle and indicates the direction of tilt; whereupon, weights are attached to the rim of the wheel such that the bubble returns to the center of the level, indicating that the wheel has been balanced. Balancers of this type, however, are not particularly accurate and fail to give any idea of the degree of unbalance. Furthermore, during normal employment of such balancers, a large number of weights must often be affixed, at numerous places along the wheel rim, to finally balance the wheel. It remains much more desirable and efficient to employ one weight, or two weights each of which are affixed at a different location, to balance the wheel.

Some static balancers are available which mount the central spindle upon a horizontal shaft or two horizontally disposed shafts which are aligned along a horizontal axis. Although such balancers are more accurate than bubble-type balancers, they are still structurally somewhat complex.

SUMMARY OF THE INVENTION

A stand assembly includes a base member which engages the ground. A standard is attached to the base and extends upwardly therefrom. A support bar is attached to the upper end of the standard. A plurality of balancing posts are attached to the support bar and extend upwardly therefrom, the balancing posts being laterally aligned and spaced. The upper ends of the balancing posts define an axis. A scale is formed on the base.

A wheel support mechanism includes a plate having a plurality of depressions formed in the underside thereof. The balancing posts are received by the depressions, and the wheel support mechanism is pivotally supported thereby upon the stand assembly.

A sensitivity adjustment mechanism includes a shaft and a weight member, the shaft being attached to the plate of the wheel support mechanism and depending therefrom, the weight member being slidably and rotatably attached to the shaft. The shaft terminates in a lower end disposed over the scale.

The wheel support mechanism pivots upon the stand assembly about the axis when an unbalanced wheel is mounted thereon, the degree of unbalance being indicated by the shaft upon the scale. After a weight has been added to the wheel such that the shaft indicates zero unbalance upon the scale, the wheel is lifted, rotated at 90° and replaced upon the wheel support mechanism. If necessary, a second weight is then added to the wheel such that the shaft again indicates zero unbalance upon the scale. The weight member is operable to adapt for wheels of different sizes and for ground or floor surfaces of different degress of smoothness.

It is an object of this invention to provide a wheel balancing apparatus which is very accurate, much more so than a typical bubble-type balancer, in balancing a vehicle wheel.

It is another object of this invention to provide a wheel balancing apparatus which is easily adjustable to a wide variety of wheel sizes and which is easily adapted for use upon ground or floor sizes of different degrees of smoothness.

Another object of this invention is to provide a wheel balancing apparatus which is easily assembled, disassembled, stored or transported.

Still another object of this invention is to provide a wheel balancing apparatus which may be locked to facilitate transport of the apparatus while assembled.

Yet another object of this invention is to provide a wheel balancing apparatus having a plurality of balancing posts whereby accurate balancing of a wheel can be attained.

A further object of this invention is to provide a wheel balancing apparatus having a tire size adapter whereby wheels of a variety of sizes may be balanced.

Another object is to provide a wheel balancing apparatus having a sensitivity adjustment mechanism which indicates the degree of unbalance of a wheel, and which aids in adapting the apparatus to rough surfaces and to wheels of different sizes.

It is also an object of this invention to provide a wheel balancing apparatus which is easy to operate, having a simple and rugged structure, and economical to make, being therefore easily affordable for and usable by private individuals, small garages and service stations.

These objects and other features and advantages of the wheel balancing apparatus of this invention will become readily apparent upon referring to the following description, when taken in conjunction with the appended drawings.

BRIEF DESCRIPTION OF THE DRAWING

The wheel balancing apparatus of this invention is illustrated in the drawing wherein:

FIG. 5 is a fragmentary front elevational view of an alternate embodiment of the wheel balancing apparatus, certain internal structures thereof being shown in dashed lines;

FIG. 6 is a top plan view of the alternate embodiment shown in FIG. 5;

FIG. 7 is a side elevational view of the alternate embodiment shown in FIG. 5, portions thereof being shown in section for greater clarity; and FIG. 8 is a fragmentary, foreshortened side elevational view of a modification of the sensitivity adjustment mechanism of the wheel balancing apparatus, two alternate methods of anchoring the spring of the modification being illustrated.

DESCRIPTION OF THE PREFERRED EMBODIMENT

Figure 1:
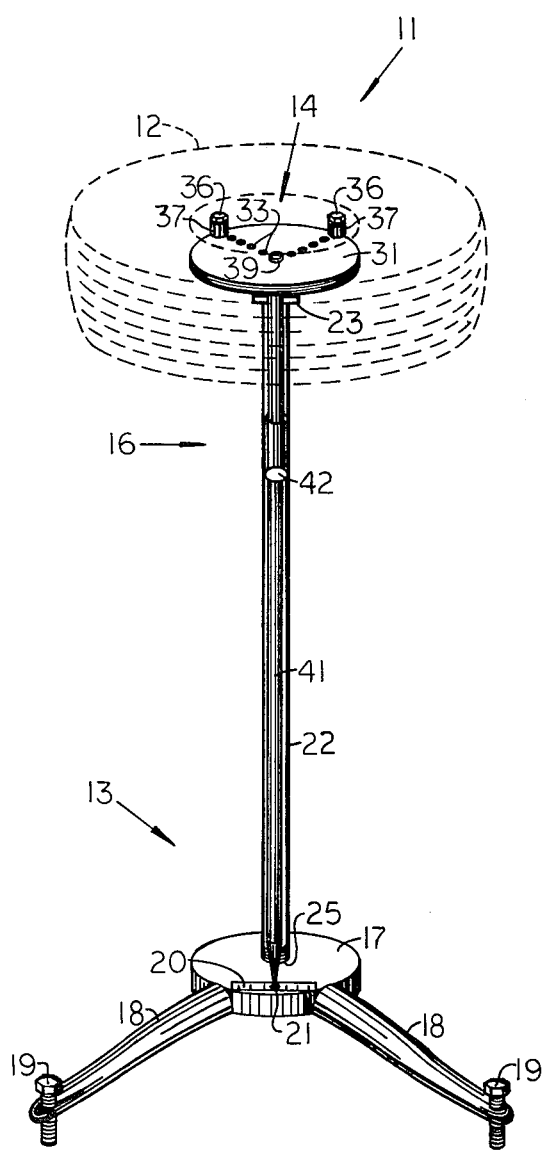
FIG. 1 is a perspective view of the wheel balancing apparatus, the wheel being balanced thereon being shown in dashed lines.

The wheel balancing apparatus of this invention is indicated generally at 11 in FIG. 1, a wheel 12, shown in dashed lines, being supported thereon. The wheel balancing apparatus 11 more particularly includes a stand assembly 13, a wheel support mechanism 14 and a sensitivity adjustment mechanism 16.

Referring again to FIG. 1, the stand assembly 13 includes a base 17. A plurality of legs 18 extend from the base 17 to engagement with the floor or ground. Leveling screws 19 are disposed in the ground-engaging ends of each of legs 18. A straight scale or rule 20 is formed on the upper surface of the base 17 and has a central zero mark or index 21. An upright shaft or standard 22 is attached to the base 17. The standard 22 may be welded to the base 17 but preferably is threaded into a bore formed in the base 17, as indicated at 25 in FIG. 1. The scale 20 is disposed upon the upper surface of the base 17 normal to the line defined by the zero mark 21 and the center of the bore 25.

Figure 4:
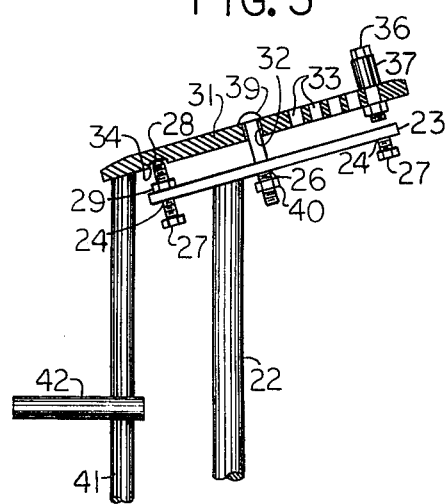
FIG. 4 is an enlarged, fragmentary side elevational view of the wheel balancing apparatus, the circular plate thereof being shown in sectional view taken along line 4—4 of FIG. 3, and part of the rear balancing post thereof being cut away for greater clarity.

Referring now to FIG. 4, a flat, elongated support plate 23 is attached to the upwardly extended end of the standard 22. The plate 23 is angularly disposed with respect to the standard 22, the lower end of the plate 23 being directed toward the front of the wheel balancing apparatus 11 and the upper end of the plate 23 being directed toward the rear. Balancing post apertures 24 are formed through the plate 23 adjacent each end thereof, and a central aperture 26 is formed through the plate 23 intermediate the ends thereof. The standard 22 is attached to the plate 23 between the front aperture 24 and central apertures 26. Front and rear balancing posts 27 are threaded through the apertures 24. The balancing posts 27 have upwardly disposed pointed ends 28 and are secured to the plate 23 by nuts 29.

Figure 2:
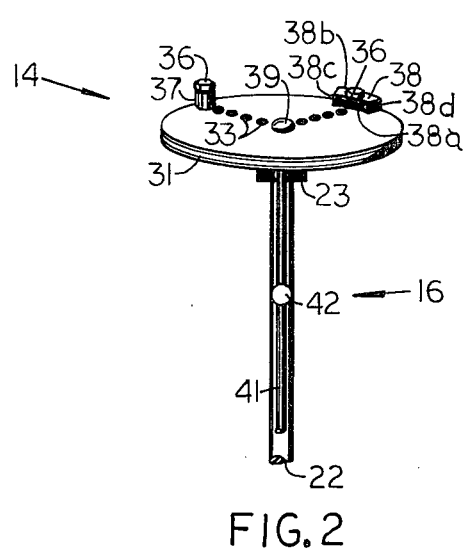
FIG. 2 is an enlarged, fragmentary front elevational view showing the wheel support mechanism of the wheel balancing apparatus.
Figure 3:
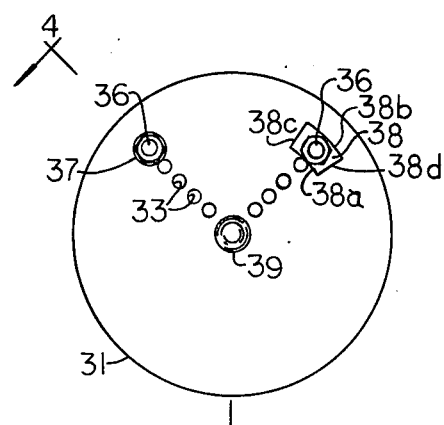
FIG. 3 is an enlarged, top plan view of the wheel balancing apparatus.

The wheel support mechanism 14, FIGS. 2, 3 and 4, is mounted upon the stand assembly 13. The mechanism 14 includes a circular plate 31. The plate 31 has a central bore 32 and a plurality of adjustment bores 33 formed therethrough. The bores 33 are aligned along two radii of the plate 31, which radii are 90° apart. Two depressions 34, one of which is shown in FIG. 4, are formed in the underside of the plate 31. The depressions 34 are located adjacent the periphery of the plate 31 and define a diameter of the plate 31 which bisects the angle between the two lines of bores 33. An adjustment bolt 36 is provided for each line of bores 33, each bolt 36 being slipped through a cylindrical sleeve membr 37, threaded through a bore 33 and secured by a nut. The sleeve members 37 rest against the upper surface of the plate 31.

FIGS. 2 and 3 also illustrate a guide piece 38. The guide piece 38 has inner and outer arcuate sides 38a, 38b and left and right planar sides 38c, 38d. Two guide pieces 38 may be used instead of sleeve members 37, the adjustment bolts 36 passing through bores formed through the pieces 38 and being threaded through the bores 33 as before. The guide pieces 38 rest against the upper surface of the plate 31. When the guide pieces 38 are properly aligned, the arcuate sides 38a, 38b define concentric circles centered upon the central bore 32, and the planar sides 38c, 38d are aligned along radii of the plate 31.

As shown in FIG. 4, the wheel support mechanism 14 is pivotally mounted upon the stand assembly 13. The pointed ends 28 of the balancing posts 27 are received within the depressions 34 in the underside of the plate 31. The plate 31 is angularly disposed with respect to the standard 22, the plate 31 being parallel to the longitudinal axis of the plate 23. An attachment bolt 39 is passed through the central bore 32 of the plate 31 and through the central aperture 26 of the plate 23. A nut 40 is threaded onto the lower end of the bolt 39. The diameters of the aperture 26 and bore 32 are greater than the cross-sectional diameter of the bolt 39 such that the plate 31 may freely pivot upon the balancing posts 27.

The sensitivity adjustment mechanism 16, FIGS. 1, 2 and 4, is affixed to the wheel support mechanism 14. The mechanism 16 includes a shaft 41. The shaft 41 is affixed to the lower disposed or front portion of the plate 31, between the lower depression 34 and the peripheral edge of the plate 31. The shaft 41 is affixed at an angle to the plate 31 and extends downwardly therefrom. The shaft 41 terminates in a lower end disposed adjacent to the scale 20 of the base 17. When the shaft 41 is directed toward the zero mark 21, the shaft 41 and standard 22 are disposed parallel.

The mechanism 16 further includes a weight 42. The weight 42, FIGS. 1, 2 and 4, is elongated and cylindrical. A transverse bore is formed through the weight 42, adjacent one end thereof, such that the shaft 41 may be received therethrough. The weight 42 is slidable along the length of the shaft 41 and rotatable about the shaft 41. An internal spring mechanism (not shown) secures the weight 42 upon the shaft 41.

An alternate embodiment of the wheel balancing apparatus 11 is depicted in FIGS. 5, 6 and 7. The modified stand assembly 13', FIGS. 5 and 7, includes a flat, elongated support plate 46. The plate 46 is affixed normal to the upper end of the standard 22. Front and rear balancing post apertures 47 are formed through the support plate 46 adjacent the ends of the plate 46. Front and rear balancing posts 48, 49 are threaded through the apertures 47, have upwardly disposed pointed ends 51 and are secured to the plate 46 by bolts at 52. The standard 22 is attached to the plate 46 about one-third of the way along the length of the plate 46 from the rear of the plate 46.

The modified wheel support mechanism 14' includes a flat, annular plate 53 with a large, central aperture 54. The annular plate 53 includes, affixed with bolts to the underside thereof, a flat plate 56. Two underside depressions 57 are formed, one in the flat plate 56 and one in the plate 53 such that a vertical plane passing through the depressions 57 would bisect the plate 53. The mechanism 14' is pivotally mounted upon the stand assembly 13', the pointed end 51 of the front balancing post 48 engaging the depression 57 formed in the plate 53 and the pointed end 51 of the rear balancing post engaging the depression 57 formed in the plate 56.

The modified wheel support mechanism 14' also includes a U-shaped underside bracket 58, FIGS. 5 and 7. The bracket 58 includes two parallel portions 59 interconnected by a transverse member 61. The bracket 58 is affixed to the underside of the annular plate 53, the portions 59 being normal to, and the member 61 being parallel to, the plane defined by the plate 53. Each of the points of attachment of the portions 59 to the plate 53 are separated by 90° from each of the depressions 57. A central shaft 62 extends upwardly from the transverse member 61 and parallel to the portions 59. The shaft 62 is threaded into the central of three bores 63 formed through the transverse member 61, the other two bores 63 being disposed adjacent each of the portions 59. A compression spring 64 encloses the central shaft 62 and rests upon the transverse member 61. A cone member 66 fits over the upwardly extended end of the shaft 62 and is secured thereon by a cotter pin 67.

The modified sensitivity adjustment mechanism 16', FIGS. 5, 6 and 7, includes a flat plate 68. The plate 68 has three bores 69 formed therethrough, one adjacent each end thereof and one intermediate the ends thereof. A shaft 71, having an upper threaded end 72, is threaded through the central bore 69 (FIG. 7) and depends from the plate 68. Connecting bolts 73, threaded into and extending between bores 63 and bores 69, join the plate 68 to transverse member 61, thereby affixing the mechanism 16' to the wheel support mechanism 14'. The plate 68 and member 61 are disposed normal to the support 46, and the support 46 extends through the space enclosed by the plate 68 and member 61. The weight 42, shown in FIGS. 1, 2 and 4, is attached to the shaft 71.

A modified weight member 77, which may be used in place of weight 42, is illustrated in FIG. 8. The weight 77 is formed from a flat member, having a straight portion 78 and a curled end portion 79 contiguous with the straight portion 78. A central aperture 81 is formed through the middle of the straight portion 78, and an end aperture 82 is formed through the straight portion 78 on the side of aperture 81 opposite from curled end 79. The shaft 41 (or shaft 71) is received through central aperture 81. A spring 83 is attached at end aperture 82 and extends downwardly therefrom.

As indicated in dashed lines in FIG. 8, the spring 83 may extend to a point of attachment 84 on the base 17. The point of attachment 84 is located on base 17 inbetween, and in alignment with, the zero mark 21 and standard 22. Alternately, the spring 83 is affixed to a lower anchoring member 86 which is flat, elongated and shaped similarly to weight member 77. The member 86 has a straight portion 87 and a curled end portion 88 contiguous with portion 87. Intermediate the ends thereof, the member 86 has a central aperture 89 formed therethrough. The member 86 also has an end aperture 91 formed therethrough adjacent the straight end thereof. The standard 22 is received through aperture 89, the member 86 being slidable along the length of standard 22. The spring 83 is affixed at end aperture 91.

When the wheel balancing apparatus 11 is to be used, an appropriate location is chosen, and the screws 19 are operated such that the base 17 is horizontally disposed. The standard 22 can be threaded into the base 17 either before or after the base 17 is leveled. The wheel support mechanism 14 or 14' is then placed upon the stand assembly 13 or 13'. The standard 22, support plate 23 or 46 and the shaft 41 or 71 define a vertical plane, the shaft 41 or 71 being disposed directly over the zero mark 21, when the wheel balancing apparatus 11 is ready to receive a wheel 12. The weight 42 projects a straight forward from the shaft 41 or 71 as shown in FIG. 1, being disposed in the same plane as the standard 22 and shaft 41 or 71. Alternately, as shown in FIG. 8, the weight member 77 is directed forward from the shaft 41 or 71 and anchoring member 86 directed rearwardly from standard 22, the members 77, 86, shaft 41 or 71 and standard 22 being disposed in the same plane.

Where wheel support mechanism 14 is employed, the adjustment bolts 36 are placed in the bores 33 appropriate for the size of the particular wheel 12 being balanced. The wheel 12 then fits upon the mechanism 14, resting against the sleeves 37 or guides 38. Where mechanism 14' is employed, the wheel 12 fits upon the cone 66, the cone 66 moving downwardly against the spring 64 until the mechanism 14' has been adapted to the size of the wheel 12.

When a wheel 12 is unbalanced, the support mechanism 14 or 14' pivots upon the stand assembly 13 or 13', the plate 31 or 53 pivoting upon the balancing posts 27 or 48, 49. The shaft 41 or 71 then points to a mark on the scale 20 to one side of the zero mark 21. An appropriate weight (not shown) is then attached to the rim of the tire 12, at a point 90° from both of the balancing posts 27 or 48, 49, such that the plate 31 or 53 pivots and the shaft 41 or 71 is swung back to a position directly over the zero mark 21. The tire 12 is then lifted and rotated 90° such that, when the tire 12 is again rested upon the mechanism 14 or 14', the weight affixed to the rim of the tire 12 is aligned with the balancing posts 27 or 48, 49 in a vertical plane. Again, should the shaft 41 or 71 swing out of alignment with the zero mark 21, an appropriate weight (not shown) is attached to the rim of the tire 12 such that the shaft 41 or 71 swings back over the zero mark 21. The tire 12 is then balanced, the weights which have been attached to the rim of the tire 12 being separated by 90°.

The sensitivity adjustment mechanism 16 or 16' is operated by sliding the weight 42 along the length of the shaft 41 or 71, the size of the wheel 12 determining the sensitivity required. The weight 42 is moved upwardly along the shaft 41 or 71 to increase the sensitivity of the wheel balancing apparatus 11 such that the shaft 41 or 71 remains disposed over the scale 20. Should the apparatus 11 be located upon a floor surface where the leveling screws 19 are not adequate to bring the base 17 into a horizontal disposition, the weight 42 is rotated about the shaft 41 or 71 to a position such that the shaft 41 or 71 is directly over the zero mark 21.

The weight member 77 is moved along the shaft 41 or 71 to perform the same function as the weight 42. The member 77 is grasped at the arcuate portion 79 and pivoted to a horizontally disposed position. The member 77 may then be moved along the length of the shaft 41 or 71 or rotated thereabout. When the member 77 is properly positioned, the arcuate portion 79 is released, and the action of the spring 83 tilts the member 77 as shown in FIG. 8. When the weight member 77 is tilted, the straight portion 78 frictionally engages the shaft 41 or 71 at 81 to secure the member 77 against slippage. To prevent the spring 83 from becoming so taut as to interfere with the movement of the wheel support mechanism 14 or 14', or from becoming so loose as to permit the member 77 to slip downwardly along the shaft 41 or 71, the anchoring member 86 is moved along the length of the standard 22. The arcuate portion 88 is grasped, and the member 86 is pivoted into a horizontal disposition. The member 86 is moved along the standard 22 to the appropriate position, and the arcuate portion 88 is released. The action of the spring 83 then causes the member 86 to tilt, as shown in FIG. 8, and frictional engagement of the straight portion 87 with the standard 22 at 89 secures the member 86.

An alternate method of operation includes placing the wheel 12 upon the support mechanism 14 or 14'. The sensitivity adjustment mechanism 16 or 16' then is operated, the weight 42 or weight member 77 being moved along the length of, and/or rotated about, the shaft 41 or 71, such that the shaft 41 or 71 is directly over the zero mark 21. The wheel 12 is then rotated 180° upon the support mechanism 14 or 14'. If the mechanism 14 or 14' then pivots upon the stand assembly 13 or 13', a weight is attached to the rim of the wheel 12, at a point 90° from both of the balancing posts 27 or 48, 49, such that the mechanism 14 or 14' pivots and swings the shaft 41 or 71 back over the zero mark 21. The wheel 12 is then rotated 90° upon the support mechanism 14 or 14', and the foregoing process is repeated. When the wheel 12 is balanced, no more than two weights have been affixed to the rim of the wheel 12, and the weights are neatly spaced 90° apart.

It is often desirable to lock the wheel support mechanism 14 or 14' against pivoting, as when the wheel balancing apparatus 11 is not to be used for short period of time and is being transported in assembled form, rather than disassembled, to an out-of-the-way place. The nut 40 is threaded upwardly along the attachment bolt 39 and against the underside of support place 23 to lock the mechanism 14 against pivoting upon posts 27. The shaft 71 is threaded upwardly, through the central aperture 69 of plate 68 and against the underside of support plate 46 to lock the mechanism 14' against pivoting upon posts 48, 49. When the mechanism 14 or 14' is locked, the stand assembly 13 or 13' and mechanism 14 or 14' are also held from separating during transportation of the assembled apparatus 11.

The wheel balancing apparatus 11 is much more accurate than the conventional bubble balancing devices, the employment of two pointed balancing posts 27 or 48, 49 and the sensitivity adjustment mechanism 16 or 16' greatly enhancing accuracy. The scale 20 further enhances the accuracy of the apparatus 11 and renders the apparatus 11 easy to use. Since the standard 22 is threaded into the base 17, and since the wheel support mechanism 14 or 14' is simply balanced upon the stand assembly 13 or 13', the wheel balancing apparatus is easily assembled or disassembled, transported or stored, and is therefore easy to use. Transportation of the assembled apparatus 11 is facilitated by the ease with which the wheel balancing mechanism 14 or 14' may be locked against pivoting, and held down, upon the stand assembly 13 or 13'. The wheel balancing apparatus 11 is easily adjustable to a wide variety of wheel sizes through operation of the adjustment bolts 36 and sleeves 37 or guides 38, the cone 66 and spring 64, and the weight 42 or weight member 77. The wheel balancing apparatus 11 is usable on rough floor surfaces by adjustment of the leveling screws 19 and operation of the mechanism 16 or 16'. Thus it can be seen that the wheel balancing apparatus 11 is eminently suited to the use of the private individual and small commercial garages and service stations. Furthermore, the apparatus 11 is simple and rugged in structure, yet economical to make and easily affordable.

Although a preferred embodiment, alternate embodiment and modifications thereof have been disclosed herein, it is to be remembered that various modifications and alternate constructions can be made thereto without departing from the full scope of the invention, as defined in the appended claims.

I claim:
1. A wheel balancing apparatus comprising:
stand means having a base, a shaft, a support bar and a plurality of balancing posts, said base being ground engageable, said shaft being detachably affixed to said base and extending upwardly therefrom, said shaft having affixed thereto at the upwardly extended end thereof said support bar, said balancing posts being parallel, affixed to said support bar, laterally spaced and aligned along said support bar and extending upwardly from said support bar, each balancing post having formed at the upwardly extended end thereof a pointed portion;
support means for holding a wheel, said support means including a flat plate, said plate having formed in the underside thereof a plurality of depressions, said depressions being laterally spaced and aligned, said pointed portions being removably received within said depressions and defining an axis, said plate being pivotable about said axis, a wheel being receivable upon said plate whereby the wheel tilts about said axis when the wheel is unbalanced; and indicating means for adjusting sensitivity having an indicator shaft and a weight, said indicator shaft being attached to said plate and depending therefrom, said weight being elongated, having a first end thereof affixed to said indicator shaft and a second end thereof extended away from said indicator shaft, said weight being slidable along the length of, and rotatable about, said indicator shaft.

2. A wheel balancing apparatus as defined in claim 1 and further wherein said support means includes a plurality of guides and said support bar is obliquely disposed upon said shaft, said plate having uppermost and lowermost disposed peripheral portions, said peripheral portions being aligned with said depressions, said indicator shaft being affixed at an angle to said plate at said lowermost peripheral portion, said guides being attached to said plate closer to said uppermost peripheral portion than said lowermost peripheral portion, said shaft and said indicator being parallel and defining a vertical plane, said indicator shaft moving out of said plane when an unbalanced wheel is received upon said plate.

3. A wheel balancing apparatus comprising:
stand means at the lower end thereof being ground engageable and at the upper end thereof having a plurality of balancing posts, said balancing posts being laterally spaced and aligned, said balancing posts extending upwardly from said stand means;
support means for holding a wheel, said support means being pivotally mounted upon said balancing posts, said balancing posts defining an axis, said support means being pivotable about said axis, a wheel being receivable upon said support means whereby the wheel tilts about said axis when the wheel is unbalanced; and
indicating means for adjusting sensitivity attached to said support means, said indicating means including a shaft and a weight means, said shaft depending from said support means, said weight means being attached to said shaft, slidable along the length of the said shaft and rotatable about said shaft, said weight means including a weight member, a spring and an anchor member, said weight member being attached to said shaft, slidable along the length of said shaft and rotatable about said shaft, said anchor member being attached to said stand means, slidable along the length of said stand means and rotatable about said stand means, said spring interconnecting said weight member and said anchor member.

4. A wheel balancing apparatus comprising:

stand means at the lower end thereof being ground engageable and at the upper end thereof having a plurality of balancing posts, said balancing posts being laterally spaced and aligned, said balancing posts extending upwardly from said stand means, said stand means including a base, a shaft, and a support bar, said base being ground engageable, said shaft being detachably affixed to said base and extending upwardly therefrom, said shaft having affixed thereto at the upwardly extended end thereof said support bar, said balancing posts being affixed to said support bar;

support means for holding a wheel, said support means being pivotally mounted upon said balancing posts, said balancing posts defining an axis, said suppot means being pivotable about said axis, a wheel being receivable upon said support means whereby the wheel tilts about said axis when the wheel is unbalanced, said support means including a plate means, said plate means having formed in the underside thereof a plurality of depressions, said depressions being aligned, said balancing posts being received by said depressions, said plate means having a central bore formed therethrough and aligned with said depressions along said axis, said suport bar having a first bore formed therethrough, said central and said first bores being aligned when said support means is mounted upon said balancing posts, said plate means having a connecting bolt passing through said central bore and said first bore, said connecting bolt being movable within said first bore whereby said plate means is allowed to pivot about said axis, said connecting bolt having a tightening member movable along the length of said connecting bolt and against said support bar, whereby said connecting bolt is locked against movement within said first bore, thereby locking said support means against movement about said axis; and indicating means for adjusting sensitivity attached to said support means.

5. A wheel balancing apparatus comprising:

stand means at the lower end thereof being ground engageable and at the upper end thereof having a plurality of balancing posts, said balancing posts being laterally spaced and aligned, said balancing posts extending upwardly from said stand means, said stand means including a base, a standard and a support bar, said base being ground engageable, said standard being detachably affixed to said base and extending upwardly therefrom, said standard having affixed thereto at the upwardly extended end thereof said support bar, said balancing posts being affixed to said support bar, said support means having a bracket depending therefrom, said support bar extending within the space enclosed by said bracket, said shaft depending from said bracket, said shaft at the upper end thereof being movable upwardly through said bracket, into the space enclosed by said bracket and against said support bar, whereby said support means is locked against movement about said axis;

support means for holding a wheel, said support means being pivotally mounted upon said balancing posts, said balancing posts defining an axis, said support means being pivotable about said axis, a wheel being receivable upon said support means whereby the wheel tilts about said axis when the wheel is unbalanced; and indicating means for adjusting sensitivity attached to said support means, said indicating means including a shaft and a weight means, said shaft depending from said support means, said weight means being attached to said shaft, slidable along the length of said shaft and rotatable about said shaft.

* * * * *